United States Patent [19]

Hemmie et al.

[11] Patent Number: 5,437,052

[45] Date of Patent: Jul. 25, 1995

[54] MMDS OVER-THE-AIR BI-DIRECTIONAL TV/DATA TRANSMISSION SYSTEM AND METHOD THEREFOR

[75] Inventors: Dale L. Hemmie, Burlington, Iowa; Charles L. Brown, Knoxville, Ill.

[73] Assignee: Conifer Corporation, Burlington, Iowa

[21] Appl. No.: 48,985

[22] Filed: Apr. 16, 1993

[51] Int. Cl.⁶ .............................................. H04H 1/00
[52] U.S. Cl. ....................................... 455/5.1; 455/6.1
[58] Field of Search ................... 455/190.1, 3.2, 5.1, 455/6.1, 4.2, 6.2, 45, 3.1, 4.1, 73, 86; 370/37; 348/7, 8, 10, 11, 12

[56] References Cited

U.S. PATENT DOCUMENTS

| | | | |
|---|---|---|---|
| 3,162,858 | 12/1964 | Cutler | 343/753 |
| 4,290,068 | 9/1981 | Bogner | 343/702 |
| 4,295,143 | 10/1981 | Winegard et al. | 343/840 |
| 4,513,293 | 4/1985 | Stephens | 343/840 |
| 4,595,890 | 6/1986 | Cloutier | 333/21 A |
| 4,719,717 | 12/1988 | Hemmie | 29/600 |
| 4,811,031 | 3/1989 | Maile et al. | 343/840 |
| 4,896,163 | 1/1990 | Shibata et al. | 343/786 |
| 4,987,486 | 1/1991 | Johnson et al. | 455/5.1 |
| 5,008,956 | 4/1991 | Hemmie | 333/203 |
| 5,019,833 | 5/1991 | Nonaka | 343/840 |
| 5,020,149 | 5/1991 | Hemmie | 455/325 |
| 5,027,430 | 6/1991 | Yamauchi et al. | 455/188.1 |
| 5,079,628 | 1/1992 | Tomikawa | 455/5.1 |
| 5,122,878 | 6/1992 | Heigl et al. | 455/180.1 |
| 5,191,350 | 3/1993 | Hemmie | 343/840 |
| 5,202,699 | 4/1993 | Hemmie et al. | 343/840 |
| 5,257,099 | 10/1993 | Morales-Garza | 455/5.1 |

FOREIGN PATENT DOCUMENTS

| | | | |
|---|---|---|---|
| 1149931 | 7/1983 | Canada | 343/840 |
| 0076642 | 6/1981 | Japan | H01Q 19/13 |
| 0003439 | 1/1982 | Japan | 455/339 |
| 0238130 | 10/1986 | Japan | H01Q 19/02 |

OTHER PUBLICATIONS

Federal Communications Commission General Docket No. 90-60.
Conifer Product Bulletin, Model QL-3010, QL-3012, Oct. 1992.
Jerrold, UHF Stacked Bowties and UHF Yagi Antennas.
Channel Master, Stop By, Booth No. 24.
Block Down Converters by Pacific Monolithics.
Lance Industries, Microwave 3 Ft., 4 Ft. or 6 Ft. Dish Parabolics.
CableVision, Tanner Electronic Systems Technology, Inc.
Lance Industries, Microwave Section Parabolics.
Conifer, MDS Receiving Equipment, 1980.
Channel Master, Channel Master Wireless Cable Equipment.

*Primary Examiner*—Edward F. Urban
*Assistant Examiner*—Nguyen Vo
*Attorney, Agent, or Firm*—Zarley, McKee, Thomte, Voorhees, & Sease

[57] ABSTRACT

An integrated bi-directional MMDS/MDS converter connected to an antenna for receiving MMDS programming for receiving information/data signals from a set top for retransmission of these signals back to central location. The integrated bi-directional converter has a down converter connected to the diplexer for down converting conventional programming signals into a group of converted programming signals in the 222 to 408 MHz range, an up converter for up converting data/information signals in the 116 to 128 MHz range from the communication line into MDS signals and delivers it into the diplexer. The diplexer applies the outgoing MDS data signals to the feed of the antenna for transmission. The integrated bi-directional MMDS/MDS converter of the present invention uses a common local oscillator for driving both the down converter and the up converter.

12 Claims, 4 Drawing Sheets

MMDS OVER-THE-AIR BI-DIRECTIONAL TV/DATA TRANSMISSION SYSTEM AND METHOD THEREFOR

BACKGROUND OF INVENTION

1. Field of the Invention

The present invention relates to a wireless system utilizing microwave frequencies to provide bi-directional transfer of programming information between a common focal point and a plurality of remote locations. More specifically, the present invention relates to the use of Multichannel Multipoint Distribution System (MMDS) frequencies to receive programming at remote locations and Multipoint Distribution System (MDS) frequencies to transmit information/data from remote locations.

2. Statement of the Problem

Consumers receive television programs one of four ways. Historically, television programming was broadcast from a central antenna to a number of rooftop antennas within a given radius of a transmitting tower. Cable then became available and allowed a much higher quality delivery of television programming to a consumer's household. While the quality of the programming substantially increased, the consumers encountered a significant increase in costs for such programming. Satellite dish antennas (TVRO) represent a third delivery system. An individual consumer pays several thousand dollars for the TVRO delivery system and also pays a monthly charge for the programming. TVRO systems allowed consumers in rural areas, however, to receive high quality programming via satellite where conventional television signals and cable would not provide delivery. The fourth type of delivery system is commonly called "wireless cable."

In a sense, wireless cable represented a return to the historical conventional delivery of television signals. A consumer purchased a rooftop microwave antenna and pointed it to a common microwave transmission source usually mounted on the top of a tower or a high location such as a mountain top. The initial "wireless cable" systems operated on the MDS frequency range of 2150 MHz to 2162 MHz. Limited programming over one or two channels was provided under MDS frequencies. With the advent of Multichannel Multipoint Distribution Systems (MMDS), with a frequency range of 2500 MHz to 2686 MHz, a plurality of channels could be simultaneously provided to the rooftop microwave antenna. MMDS "wireless cable" systems are becoming popular nationwide and, in fact, worldwide, principally in comparison to the much greater expense of purchasing and installing cable. For example, in a community of five-acre home sites, the laying of cable would be prohibitively expensive whereas provision of wireless cable to such sites would be significantly less costly.

Developing simultaneously, with the development of television programming systems, as described above, is the need to provide feedback from the consumer to the program delivery source such as, for example, pay per view (PPV) systems. Cable systems have the unique advantage of providing a solid two-way connection path between the consumer and the source of programming. In TVRO and wireless cable systems, no such link exists and the consumer must rely on making a phone call to the programming source (or other location) to order pay per view programming. Pay per view programming is used as an example and it is to be understood that many other services contemplate a return data transmission path from the consumer to the source of programming (for example, ordering of merchandise, computer data, etc.).

General Instruments currently manufactures a set top that provides for a standard telephone hook up for sending data back to the billing computer. This system is identified as Model No. 1507 MU and is available from General Instruments, 2200 Byberry Road, Hatboro, Pa. 19040. This system is easily installed by a customer to access pay per view programming. Hooking up a telephone line to every set top, however, is costly and the customers are sometimes on a long distance exchange or party line.

A need exists for a wireless cable system to provide a return information/data path back to the source of programming. The system implementing this must provide the return data path using the available frequencies and at a low cost to the consumer. The service must use the existing equipment as much as possible.

Presently, Instructional Television Fixed Service (ITFS) response frequencies (2686.0625 MHz to 2689.8125 MHz) are being considered for use as return link frequencies by the FCC. See FCC General Docket No. 90-60. This approach is somewhat expensive and elaborate due to the fact that the receive and transmit frequencies are so close to one another—normally requiring separate receive and transmitting antennas and a separate down converter for receiving the ITFS signal and for the transmitter (low power for sending back the return audio link). The power required for the return link is relatively small (less than 100 milliwatts) but, due to the close proximity of the frequencies, overload of the receive down converter is a problem. Another problem exists with using ITFS response frequencies in that interference and disruption of the service may result. The close proximity of ITFS response frequencies (2686.0625/2689.8125 MHz) to ITFS/MMDS band (2500/2686 MHz) would require physically large, high Q and expensive filters to minimize interference between transmit and receive signals.

While it has been suggested to use the existing MDS frequencies to return information/data, no system presently exists.

A need, therefore, exists to enable wireless cable operators and users to utilize the MDS frequencies for pay per view programming, computer links, banking, home shopping, medical alarm, and fire/security as well as to receive standard programming at a minimum cost. Heretofore, this has only been available to wireless consumers through use of standard telephone hookups.

Solution to the Problem

The present invention provides a solution to the above stated problem by providing a two way or bi-directional transfer of programming and information/data between a common transmission point such as a tower and each of a plurality of remote locations such as consumers' house. The present invention accomplishes this by utilizing the same microwave antenna at a consumer's house for receipt of programming and for transmission of data. A unique bi-directional converter is utilized to down convert the microwave programming signals and to up convert data microwave transmission signals. The converter operates using overlapping or common components to minimize the cost to the consumer. The present invention utilizes a mast mounted receive/transmit converter that incorporates a common local oscillator to down convert incoming microwave television signals while simultaneously up converting outgoing information and data signals to the transmission tower. The present invention utilizes the existing MMDS frequencies to down convert programming signals to the remote locations and provides a new use for the existing MDS frequencies to transmit information/data from the remote locations to the common transmitter.

SUMMARY OF THE INVENTION

An integrated bi-directional MMDS/MDS converter is disclosed which is connected to an antenna for receiving MMDS programming from an antenna and which is further connected to a communications line for receiving information/data signals from a set top for retransmission of these signals back to a central location.

The present invention sets forth an integrated bi-directional converter having a down converter operative with a diplexer for down converting the conventional MMDS programming signals into a group of converted programming signals in the 222 to 408 MHz range, and a band separator operative with the down converter and receptive of the group of converted programming signals for delivering these signals out from the bi-directional converter to a communications line.

The present invention incorporates an up converter operative with the band separator for up converting data/information signals from the communications line as separated by the band separator from the converted programming signals being simultaneously transferred. The up converter converts the data/information signals into MDS data signals and delivers them into the diplexer. The diplexer applies the outgoing MDS data signals to the feed of the antenna for transmission.

The integrated bi-directional MMDS/MDS converter of the present invention uses a local oscillator for driving both the down converter and the up converter and commonly shares the diplexer and band separator.

BRIEF DESCRIPTION OF THE DRAWING

FIG. 1 illustrates the present invention in the environment of a wireless cable system, FIG. 2 sets forth the present invention, in block diagram format, of the various components contained therein at the location of the remote consumer, FIG. 3 sets forth the present invention, in block diagram components at the location of the common transmitter, and FIG. 4 sets forth the details of the bi-directional converter of the present invention.

DETAILED SPECIFICATION

1. Overview

Figure 1:
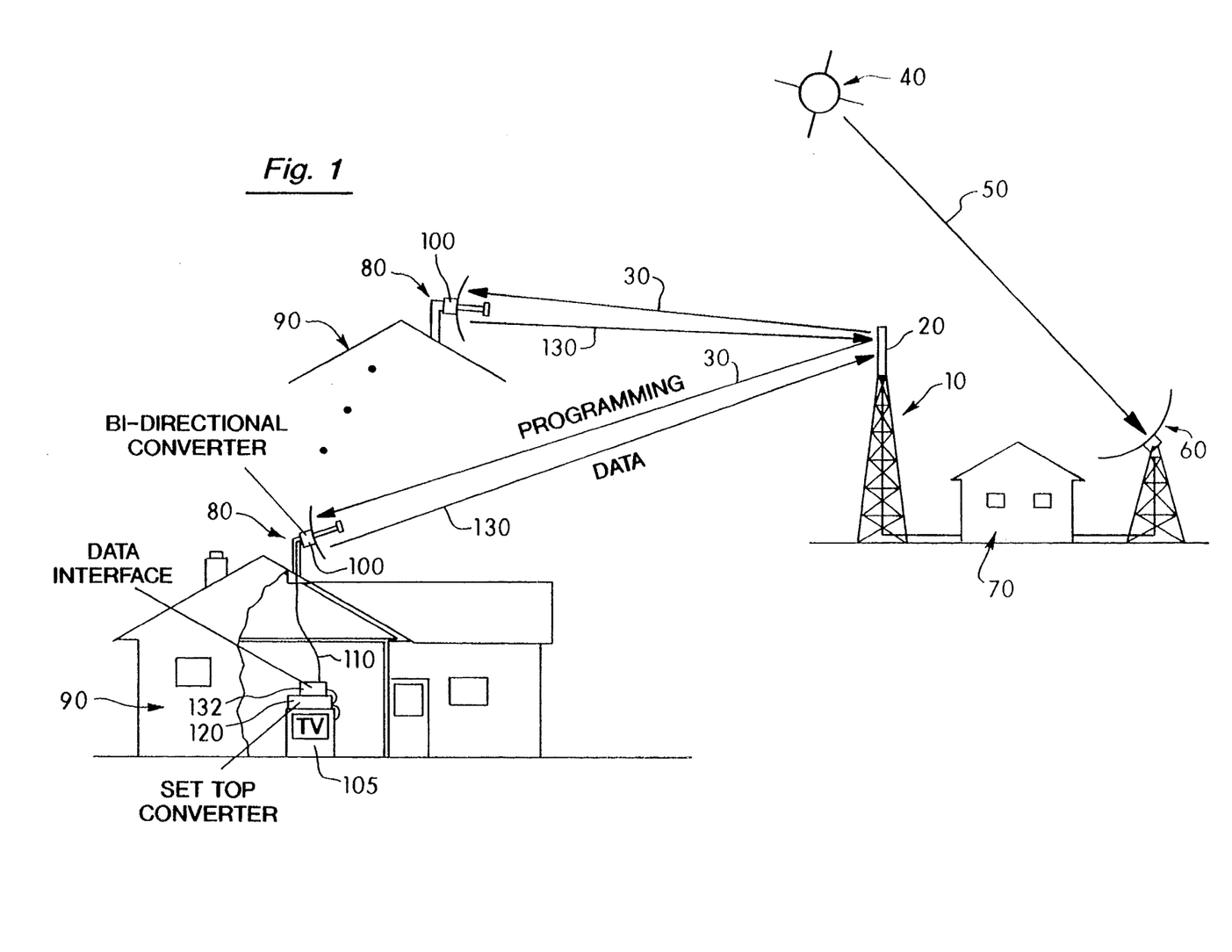

In FIG. 1, the present invention is illustrated in the environment of a conventional MMDS "wireless cable" system. The common antenna 20 is located at a central or common focal point 10. The microwave transmitter 20 transmits programming signals 30. Typically, the programming signals 30 are delivered from a satellite 40 that transmits programming 50 to a base station 60. At the base station is a set of electronics 70 that in turn causes the programming to he redelivered and transmitted as programming 30 to a rooftop antenna 80 located on the roof of a consumer's house 90. The antenna 80 has a down converter 100 that down converts the programming signals and delivers them over communications link 110 to receiver 105. This is a typical prior art system for receiving MMDS programming from the common transmitter 20. The plurality of houses 90 simultaneously receives the programming 30.

The present invention significantly improves upon the above described conventional programming delivery system by enabling each location 90 to transmit information/data hack to antenna 20 at the common transmission location. In FIG. 1, each location 90 is provided a set top converter 120 that permits the consumer to input data or information. The set top converter 120 is connected to a data interface device 132 that provides data up cable 110 to the bi-directional converter 100 of the present invention. The data is up converted and the antenna 80 transmits the data as MDS signal 130 to the common microwave antenna 20 which is also configured to receive this signal and to deliver the data to the central location 70 for processing.

It is to be understood that the set top converter 120 could also comprise a personal computer or any other suitable type of device.

In this fashion, a two way communication link is provided between antenna 80 and antenna 20 wherein antenna 20 commonly transmits programming 30 over MMDS frequencies to a plurality of rooftop antennas 80 and wherein each of the plurality of rooftop antennas 80 is capable of independently, but simultaneously, up converting outgoing data over the MDS frequencies. Hence, the present invention significantly expands the communication abilities of wireless cable while fully making use of the present MDS frequency range which heretofore has only been used for programming.

The bi-directional converter 100 of the present invention is the heart of the operation of the present invention and permits such two way communication to utilize existing rooftop antennas 80 and to share common components.

The present invention offers significant advantages. By eliminating the use of phone lines, the present invention has a lower cost. By providing a self-contained system, the use of an outside entity such as a telephone company is not required. Combining return information into the existing wireless cable design increases control and reliability while providing less interference and disruption of the service.

It is to be expressly understood, and as will be explained subsequently, that the bi-directional converter of the present invention is not limited to the MMDS/MDS frequency ranges and that the concepts contained in the bi-directional converter of the present invention find application in other uses and applications.

2. Remote Location

Figure 2:
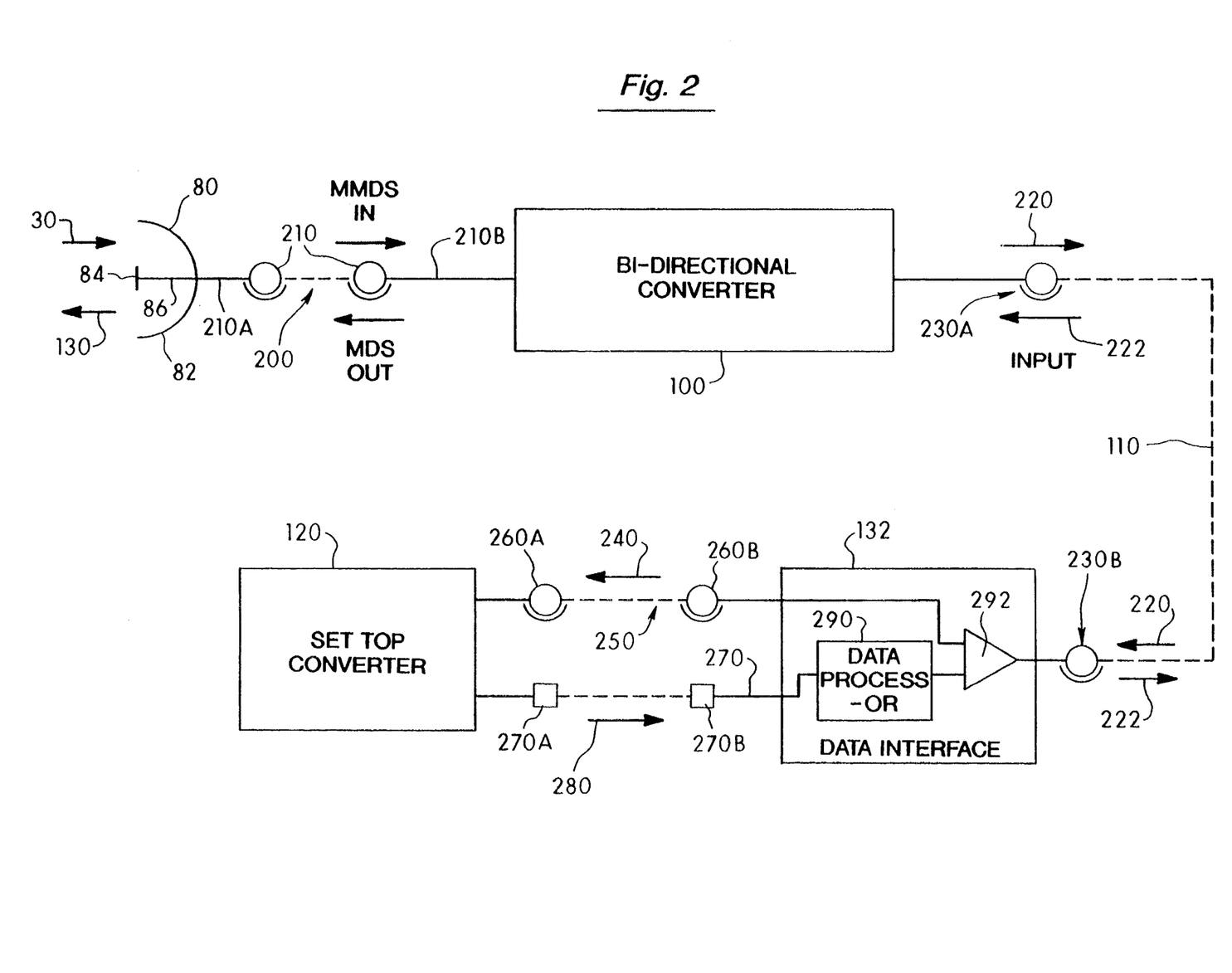

In FIG. 2, the details of the components located at the remote location such as a consumer's house 90 are set forth. The four basic components of FIG. 1 are illustrated: the antenna 80, the bidirectional converter 100, the data interface 132, and the set top converter 120.

The antenna 80 is a conventional MMDS antenna such as that fully disclosed in U.S. Pat. No. 5,191,350, entitled "Low Wind Load Parabolic Antenna" issued Mar. 2, 1993, and commonly owned by the present assignee. The antenna 80 has a semi-parabolic and microwave reflector 82, a microwave feed 84 and a support boom 86. The microwave signals are delivered to and from the antenna 80 over link 200.

In operation, the antenna 80 conventionally receives signals 30 that are delivered in the MMDS frequency range (2500 MHz to 2686 MHz) and that contain conventional programming. Under the teachings of the present invention, the antenna 80 also retransmits information/data as represented by signal 130 in the MDS frequency range (2150 MHz to 2162 MHz). The feed 84 is conventional and could be of the type such as fully set forth above in U.S. Pat. No. 5,191,350. "Stacked Dual Dipole MMDS Feed" Ser. No. 07/733,108, filed Jul. 19, 1991, also commonly assigned to the assignee of the present invention, sets forth a conventional stacked dipole feed particularly well suited for retransmission of MDS data signals due to its superior feed characteristics such as: greater bandwidth, lower VSWR, greater directivity and cross-polarity rejection.

The bi-directional converter 100 of the present invention is interconnected to antenna 80 over link 200. In the embodiment of FIG. 2, link 200 illustrates a common coax connection 210. The connection 210 is for purposes of illustration only and it is to be understood that a number of different approaches can be used to connect the bi-directional converter 100 to the antenna 80. For example, in U.S. Pat. No. 5,202,699 entitled "Integrated MMDS Antenna and Down Converter" issued Apr. 13, 1993 (commonly assigned), the bi-directional converter 100 could be located in the support boom 86 and directly coupled to the feed 84 thereby eliminating the need of a coaxial connection 210 altogether. Or, as described in U.S. Pat. Nos. 4,791,717 ("Interdigital Filter Apparatus and Method for Construction") or 5,020,149 ("Integrated Down Converter and Interdigital Filter Apparatus and Method for Construction Thereof"), commonly owned by the present assignee, an actual coax connection can be utilized. In this embodiment and as shown in FIG. 1, the bi-directional converter 100 would be mounted to the rear of the antenna 80. It is to be expressly understood that the physical location of the bi-directional converter and the means of interconnecting it to the antenna 80 can vary, under the teachings of the present invention, from application to application. The bi-directional converter 100, under the teachings of the present invention, is coupled to the feed 84 so as to down convert MMDS signals 30 carrying programming and to up convert data and information into MDS signals 130.

The bi-directional converter 100 will be discussed in more detail in the next section with respect to FIG. 3. The bi-directional converter 100 connected to link 110, however, functions to down convert the MMDS frequencies into a frequency range of 222 to 408 MHz as represented by arrows 220 and to up convert frequencies in the 116 to 128 MHz range to the MDS frequency range as represented by arrows 222 to the MDS frequency range. Again, communication link 110, in the present invention, is a coax cable having conventional coax connectors 230. As shown in FIG. 1, coax 110 delivers the MMDS signals 220 from the bi-directional converter 100 usually located on the antenna 80 downwardly into a consumer's house to the data interface device 132.

The data interface device 132 functions to deliver programming as represented by arrow 240 over coax connection 250 to the set top converter 120 or directly to the receiver 105. Again, the coax connection 250 has conventional coax connectors 260. The data interface 132 receives data, such as digital data, over lines 270 and conventional connections 270(a) and (b). The data interface device 132 functions to deliver the programming signals 240 to the set top converter 120 from the bi-directional converter and to process the digital signals from the set top converter 120 (or from an alternate source such as a personal computer) into data signals 222 preferably in the 116 to 128 MHz range.

As shown in FIG. 2, the conversion of data 280 into signals 222 is accomplished through use of a data processor 290. A band separator 292 is used to deliver programming signals 240 to the set top converter 120 and to deliver data signals from the data processor 290 simultaneously to coax 110. The band separator 292 is preferably a low pass/high pass separator wherein the low pass cut-off is 128 MHz and the high pass cut-off is 222 MHz. The data processor 290 is an up converter converting 10 MHz or other frequency signals carrying data as may be sent out of set top converters to the required 116 to 128 MHz range.

The set top converter 120 delivers the programming signals 240 to the television set 120 and generates the information/data signals 280 such as for pay per view and the like. It is to be understood that the connections 250 and 270 between the set top 120 and the data interface 132 are by way of example and that other approaches could be used. For example, a single cable connection could be used. Furthermore, the data interface 132 could be incorporated directly into the set top converter.

In summary, FIG. 2 sets forth the component at one of the remote locations 90. In operation, MMDS programming signals 30 are received by antenna 80, reflected into the feed 84 which is delivered through link 200 to the bi-directional converter 100. Bi-directional converter 100 then converts the programming signals in the MMDS range into a suitable range of frequencies such as in the 222 to 408 MHz range and delivers them on link 110 as programming signals 220. The data interface 132 decouples these signals and delivers them over link 250 as shown by programming signals 240 either into the television 105 or into the set top converter 120. Simultaneously, the set top converter 120 delivers information/data signals 280 over link 270 into the data interface 132 which delivers it as data signals 222 in a suitable range of frequencies such as in the range of 116 to 128 MHz over link 110 and into the bi-directional converter 100. The bi-directional converter 100 up converts the data signals 222 from link 110, delivers them over communications link 200 into the feed 84 of the antenna 80, for transmission as MDS data signals 130. Hence, the bi-directional converter 100 can simultaneously up link and down link signals which, according to the preferred embodiment of the present invention, use the MMDS range to carry programming and the MDS range to carry data.

3. Common Transmitter Location

Figure 3:
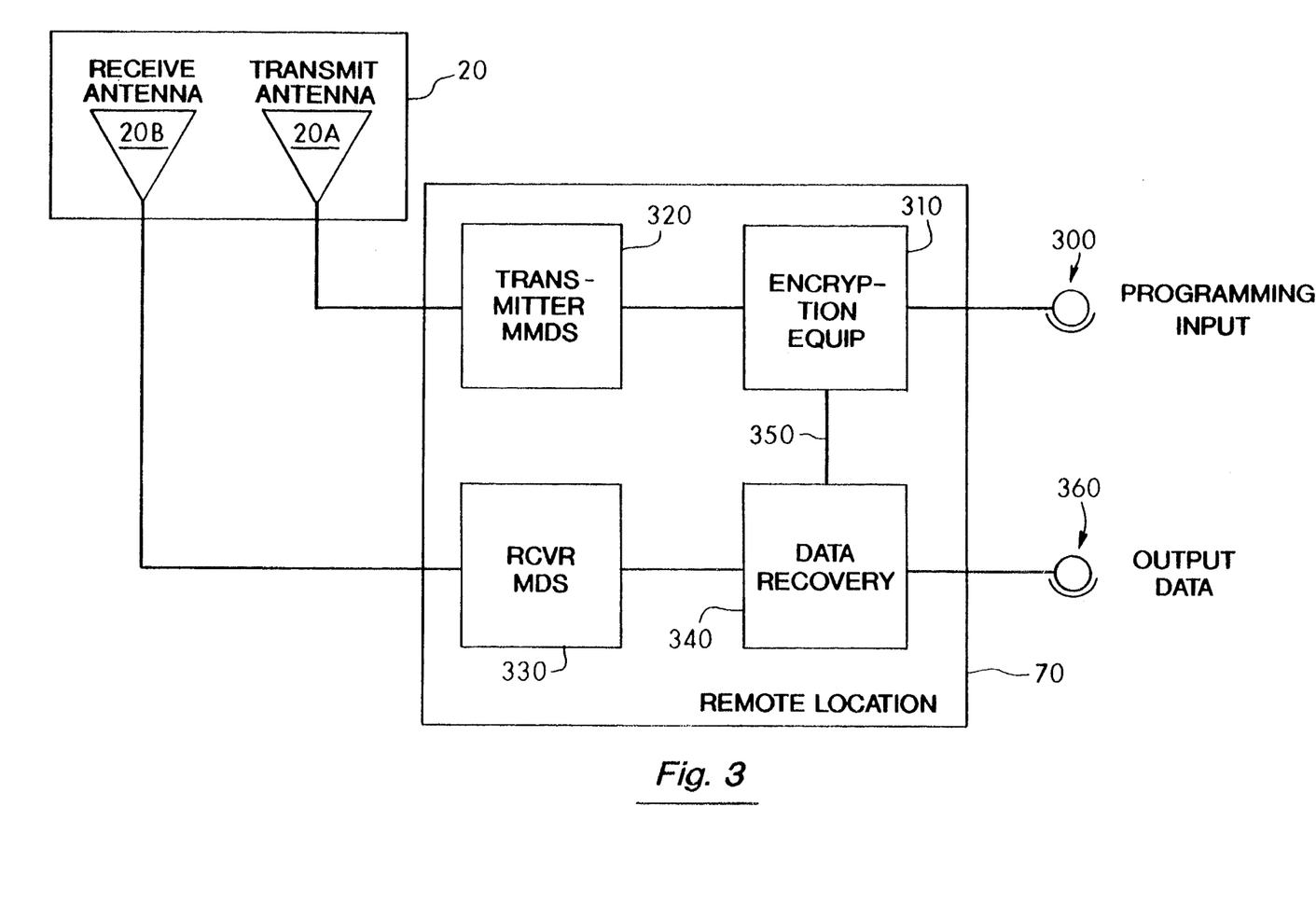

In FIG. 3, the general components at the common transmit location 70 are shown. The common transmitter and antenna 20, in one embodiment, simultaneously transmits and receives signals 30 and 130. In another embodiment, the transmit antenna 20(a) and the receive antenna 20(b) are separate antennas at the same location. Programming is received at input 300 such as from a satellite dish antenna 60. The programming may be selectively delivered through encryption equipment 310 before delivery into the transmitting electronics 320. Such electronics are conventional in the MMDS industry.

The receive antenna receives the antenna signals 130 and delivers them into an MDS receiver 330. MDS receivers 330 are conventionally available having been used for receiving MDS programming. However, the data recovery circuit 340, under the teachings of the present invention, receives the MDS signal and recovers data and information therefrom. In one embodiment, the signals are delivered over lines 350 into the encryption unit 310 and in another embodiment, the signals are delivered over lines 360 as data for downstream use. In a pay per view environment, the encryption unit 310 is activated by signals on line 350. In another embodiment, such as purchasing goods and materials over a home catalogue network, the data signals 360 are delivered outwardly from the system.

In summary, at the common remote location 70, the MMDS programming signals are conventionally delivered and the MDS signals modified to carry information and data, as taught in the above section, and the information and data are recovered, either to activate suitable encryption equipment or to deliver data outwardly from the system.

4. Bi-Directional Converter

Figure 4:
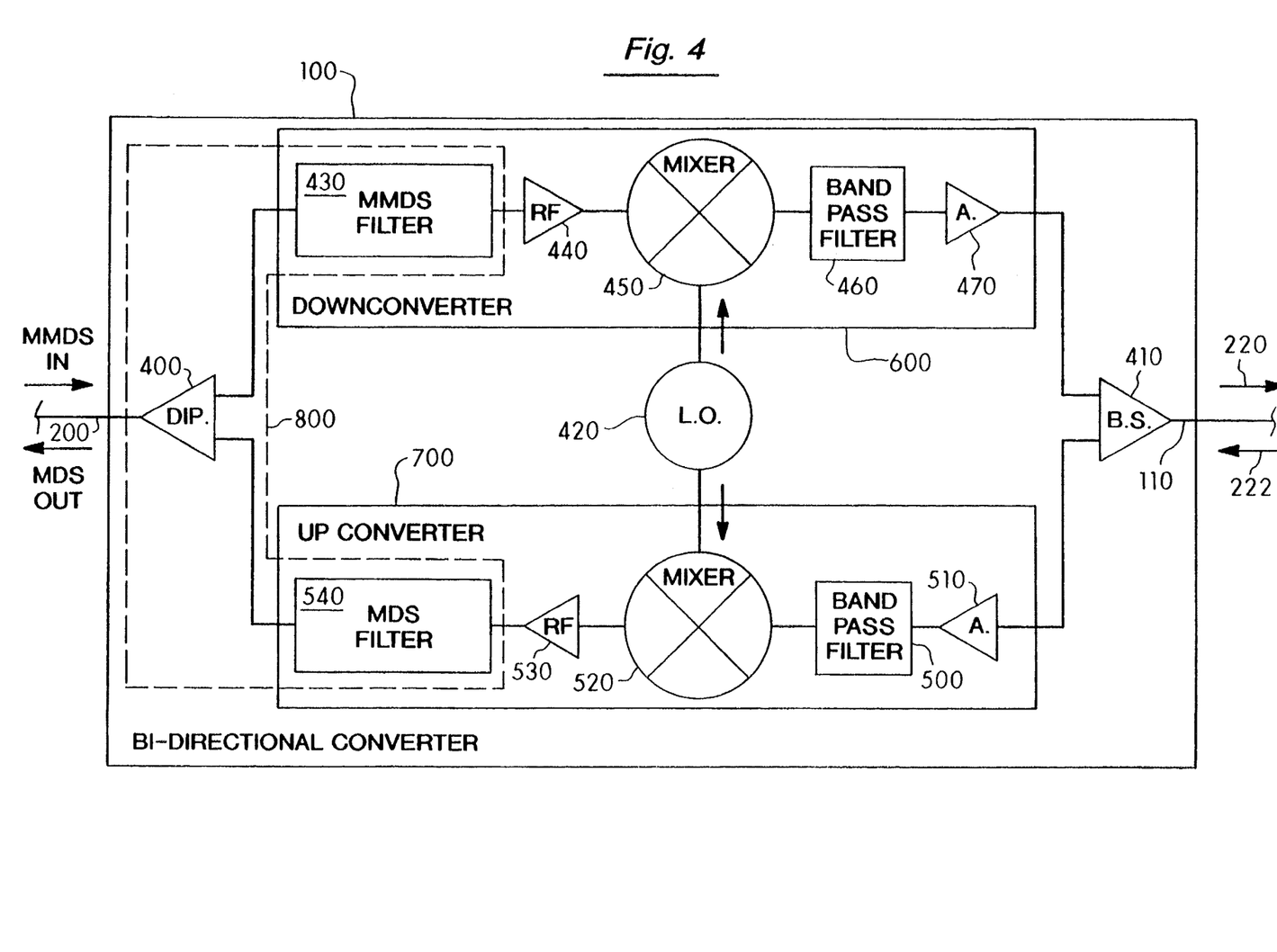

A preferred embodiment of the bi-directional converter of the present invention is set forth in FIG. 4. The bi-directional converter 100 utilizes a common diplexer 400, a common band separator 410 and a common local oscillator 420. The diplexer 400 receives the MMDS signals from line 200 and delivers them into a filter 430 designed for the conventional MMDS groups A through G. An example of a filter 430 would be an MMDS interdigital filter. The output of the filter 430 is delivered into an RF amplifier 440 which delivers the signal into a mixer 450 and from the mixer into a band filter 460 from which it is then amplified by amplifier 470. The amplified programming signals are then delivered through the band separator onto communication link 110. The operations of the MMDS filter 430, the RF amplifier 440, the mixer 450, the band pass filter 460 and the amplifier 470 are conventional and the design of this, in one embodiment, is based upon the assignee's commercially available Model QL-3010 down converter which is based upon U.S. Pats. Nos. 4,791,717 and 5,020,149.

In operation, the local oscillator 420 operates at a fixed frequency such as 2278 MHz and delivers a signal into the mixer 450 which down converts the MMDS signals into programming signals 220.

The return information path operates as follows. The data signals 222 are received on communication link 110. These data signals 222 are delivered simultaneously with the programming signals 220 and the band separator 410 separates the data signals 222 and delivers them into an amplifier and level limiter 510, which is then delivered into a band pass filter 500. The amplified signals are then delivered into a mixer 520 for downstream delivery into an RF amplifier 530, which delivers its output into the MDS filter 540. Amplifier 510 may also have level limiting circuitry to control the gain of the amplifier to be within any required FCC transmission rules such as, for example, 100 milliwatts. The output of MDS filter 540 is delivered into the diplexer 400, which in turn simultaneously delivers the outgoing MDS information/data signals. Again, filter 540 in the preferred embodiment is an interdigital filter.

It is to be understood that FIG. 4 illustrates filters 430 and 540 as separate components from diplexer 400 for purposes of discussion and that the three are physically combined together in the preferred embodiment as shown by dotted lines 800.

The bi-directional converter of FIG. 4 utilizes a common local oscillator 420, which results in a design costs savings for the present invention. The bi-directional converter in FIG. 4 is integrated into a single housing which further reduces the cost of the overall invention. This particular design is important in that a single converter is utilized to down convert the MMDS signals while simultaneously up converting the MDS signals. The present invention utilizes the MDS frequency range in a manner never before utilized, that is, for the delivery of information and data from each one of the plurality of remote locations 90 to central transmitter 20.

5. Method of Operation

In reference to FIG. 2, the method of the present invention provides a bi-directional converter which simultaneously down converts MMDS programming signals 220 while simultaneously up converting data signals 222 into MDS data signals 130.

With reference to FIG. 4, the diplexer 400 simultaneously receives MMDS programming signals 30 from antenna 80 while transmitting MDS data signals out. The diplexer 400 delivers MMDS programming signals to the down converter 600 while simultaneously receiving MDS data signals from the up converter 700. The down converter 600 and the up converter 700 commonly use the same local oscillator 420 for conversion. The band separator 410 simultaneously receives the converted programming signals and delivers them on the communication link 110 as signals 220 and simultaneously receives the data signals 222 and delivers them to the up converter 700.

It is to be expressly understood that the claimed invention is not to be limited to the description of the preferred embodiment but encompasses other modifications and alterations within the scope and spirit of the inventive concept.

We claim:

1. A bi-directional MMDS/MDS over-the-air communications system for receiving MMDS programming and for transmitting MDS data, said system comprising:
   an antenna, said antenna receiving said MMDS programming and transmitting said MDS data,
   a bi-directional converter connected to said antenna for down converting said received MMDS programming from said antenna into a group of converted MMDS signals in a first predetermined frequency range,
   a receiver,
   a communications link connected to said receiver and to said bi-directional converter for delivering said group of converted MMDS signals over said communications link to said receiver,
   means connected over said communications link to said bi-directional converter for generating data in a second predetermined frequency range, said communications link simultaneously delivering said group of converted MMDS signals and said generated data,
   said bi-directional converter responsive to said generated data in said second predetermined frequency range over said communications link for up converting said generated data in said second predetermined frequency range from said generating means into said MDS data, said antenna responsive to said MDS data from said bi-directional converter for transmitting said MDS data, said bi-directional converter down-converting said received MMDS programming simultaneously with up-converting said generated data.

2. The system of claim 1 wherein said first predetermined frequency range is 222 to 408 MHz.

3. The system of claim 1 wherein said second predetermined frequency range is 116 to 128 MHz.

4. An integrated bi-directional MMDS/MDS converter connected to an antenna for receiving MMDS signals and transmitting MDS signals, said integrated bi-directional MMDS/MDS converter further connected to a communications line for receiving signals carrying data, said integrated bi-directional MMDS/MDS converter comprising:
 means connected to said antenna for outputting said MMDS signals,
 means connected to said outputting means for down converting said MMDS signals into a group of converted MMDS signals,
 means connected to said down converting means and responsive to said group of converted MMDS signals for delivering said group of converted signals onto said communications line, said delivering means further receiving said signals carrying data from said communications line, said delivering means outputting said signals carrying data on said communications line.
 means connected to said delivering means for up converting said signals carrying data from said delivery means into said MDS signals,
 said outputting means further responsive to said MDS signals from said up converting means for delivering said MDS signals to said antenna, and
 means connected to said down converting means and to said up converting means for providing a common local oscillator so as to up convert said signals carrying data and to down convert said MMDS signals simultaneously.

5. An integrated bi-directional MMDS/MDS converter connected to an antenna for receiving MMDS signals and transmitting MDS signals, said integrated bi-directional MMDS/MDS converter further connected to a communications line for receiving signals carrying data, said integrated bi-directional MMDS/MDS converter comprising:
 a diplexer connected to said antenna for outputting said MMDS signals from said antenna,
 a down converter connected to said diplexer for down converting said outputted MMDS signals from said diplexer into a group of converted MMDS signals,
 a band separator connected to said down converter and responsive to said group of converted MMDS signals for delivering said group of converted MMDS signals onto said communications line, said band separator further receiving said signals carrying data from said communications line,
 an up converter connected to said band separator for up converting said signals carrying data from said communications line into said MDS signals.
 said diplexer responsive to said MDS signals from said up converter for delivering said MDS signals to said antenna, and
 a local oscillator connected to said down converter and to said up converter for simultaneously generating said group of converted MMDS signals and said MDS signals.

6. The integrated bi-directional MMDS/MDS converted of claim 5 wherein said down converter further comprises:
 a filter connected to the diplexer, said filter having an output,
 an RF amplifier connected to the output of the filter, said RF amplifier having an output,
 said local oscillator generating an oscillator signal,
 a mixer receptive to the output of the RF amplifier and to the oscillator signal from the local oscillator, said mixer having an output,
 a band pass filter connected to the output of said mixer, and
 an amplifier connected to the band pass filter, said amplifier having an output, the output of the amplifier connected to the band separator.

7. The integrated bi-directional MMDS/MDS converter of claim 5 wherein said converter comprises:
 an amplifier with level control connected to the band separator, said amplifier having an output,
 a band pass filter connected to the output of the amplifier with level control, said band pass filter having an output,
 said local oscillator generating an oscillator signal,
 a mixer connected to the output of the band pass filter and receptive to the oscillator signal from the local oscillator, said mixer having an output,
 an RF amplifier connected to the output of the mixer, said RF amplifier having an output, and,
 a filter connected to the output of the RF amplifier for delivering said MDS signals to the diplexer.

8. An integrated bi-directional MMDS/MDS converter connected to an antenna for receiving MMDS signals and transmitting MDS signals, said integrated bi-directional converter further connected to a communications line for receiving signals carrying data, said integrated bi-directional MMDS/MDS converter comprising:
 a diplexer connected to said antenna for outputting said MMDS signals,
 a local oscillator for generating an oscillator signal,
 a down converter connected to said diplexer for down converting said MMDS signals into a group of converted MMDS signals, said down converter comprising:
  (a) a down converter filter connected to the diplexer, said down converter filter having an output,
  (b) a down converter RF amplifier connected to the output of said down converter filter, said down converter RF amplifier having an output,
  (c) a down converter mixer responsive to the output of the down converter RF amplifier and to the oscillator signal from said local oscillator, said down converter mixer having an output,
  (d) a down converter band pass filter connected to the output of said down converter mixer, and
  (e) a down converter amplifier connected to the down converter band pass filter,
 a band separator connected to said down converter and receptive of said group of converted MMDS signals from said down converter amplifier for delivering said group of converted MMDS signals onto said communications line, said band separator receiving said signals carrying data from said communications line, an up converter connected to said band separator for up converting said signals carrying data into said MDS signals, said up converter comprising:
  (a) an up converter amplifier with level control connected to the band separator, said up converter amplifier having an output,
  (b) an up converter band pass filter connected to the output of said up converter amplifier, said up converter band pass filter having an output,
  (c) an up converter mixer connected to the output of said up converter band pass filter and responsive to the oscillator signal from the local oscillator, said up converter mixer having an output signal,
  (d) an up converter RF amplifier connected to the output of the up converter mixer, said up converter RF amplifier having an output, and
  (e) an up converter filter connected to the output of the up converter RF amplifier for delivering said MDS signals to the diplexer,
said diplexer receptive of said MDS signals from said up converter for delivering said MDS signals to said antenna, and
said local oscillator connected to said down converter and to said up converter for simultaneously generating said group of converted MMDS signals and said MDS signals.

9. The integrated bi-directional converter of claim 8 wherein said down converter filter and said up converter filter are each interdigital filters.

10. The integrated bi-directional converter of claim 8 wherein said down converter filter, said up converter filter and said diplexer are one component.

11. An improved over-the-air bi-directional TV/data transmission system for receiving MMDS programming and transmitting MDS data, said transmission system having an MMDS microwave frequency range antenna for receiving said MMDS programming, a down converter located at the antenna, a remote receiver, and a coax line connecting the receiver to the down converter, said improvement to said transmission system comprising:
  said down converter connected to said antenna for down converting said received MMDS programming from said antenna into a group of converted signals in a first predetermined frequency range for delivery over said coax line to said remote receiver,
  means at the location of said remote receiver and connected to said coax line for generating data in second predetermined frequency range over said coax line simultaneously with the delivery of said group of converted signals,
  an up converter connected to said antenna and to said coax line responsive to said data in said second predetermined frequency range over said coax line for up converting said generated data in said second predetermined frequency range from said generating means into said MDS data, said antenna responsive to said MDS data from said up converter for transmitting said MDS data, said down converter and said up converter operating simultaneously.

12. The improvement of claim 11 further comprising:
  a diplexer connected to said antenna for outputting said MMDS programming from said antenna,
  said down converter connected to said diplexer for down converting said outputted MMDS programming from said diplexer into said group of converted signals,
  a band separator connected to said down converter and responsive to said group of converted signals for delivering said group of converted signals onto said coax line, said band separator further receiving said generated data in said second predetermined frequency range from said coax line,
  said up converter connected to said band separator for up converting said generated data in said second predetermined frequency range from said coax line into said MDS data
  said diplexer responsive to said MDS data from said up converter for delivering said MDS data to said antenna, and
  a local oscillator connected to said down converter and to said up converter for simultaneously generating said group of converted signals and said MDS data.

* * * * *